April 20, 1937.  O. H. DICKE  2,077,620
ADJUSTABLE CONNECTING MEANS
Filed Aug. 29, 1934
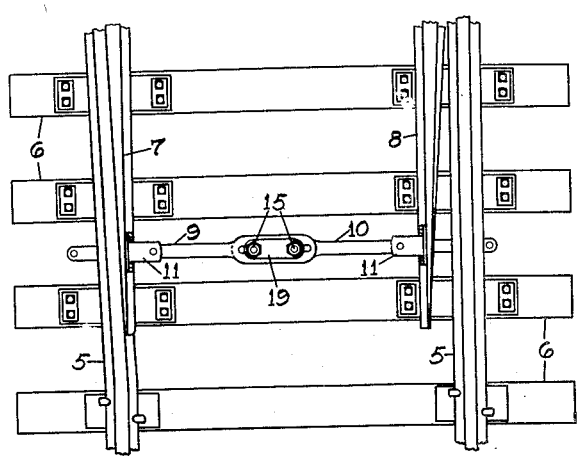
INVENTOR
Oscar H. Dicke,
BY Neil D. Preston,
HIS ATTORNEY Patented Apr. 20, 1937

2,077,620

UNITED STATES PATENT OFFICE 2,077,620

ADJUSTABLE CONNECTING MEANS

Oscar H. Dicke, Rochester, N. Y., assignor to General Railway Signal Company, Rochester, N. Y.

Application August 29, 1934, Serial No. 741,952

5 Claims. (Cl. 246—450)

This invention relates to adjustable connecting means, and more particularly to a means for securely interconnecting parts of railway devices which permits an accurate relative adjustment of the parts.

In interconnecting the movable points of a railway track switch and in mounting various devices on railway vehicles and the like, mechanical connections must be provided which can withstand considerable tensional forces, and yet such connections must permit one member to be adjusted very accurately relative to the other at various times to compensate for wear or other changing conditions affecting the spacing of the members. The relatively movable members of such adjustable connections must then be provided with some gripping means such as interfitting teeth, or the like, in order to prevent slipping when subjected to large tensional forces, and inasmuch as these interfitting teeth necessarily graduate the increments of adjustment, a very accurate adjustment can only be permitted by very fine and closely spaced teeth which then become so weak that they are ineffective to resist large tensional forces.

In view of the above and other considerations, it is an object of the present invention to provide a mechanical connecting means so arranged that the parts thereof are prevented from slipping by interfitting means of very rugged construction, and yet which permit an extremely fine adjustment of the relative positions of the members connected thereby. Another object of the present invention is to incorporate a means whereby the parts which are thus adjustably connected may also be electrically insulated, and yet retain the advantages of the extremely fine adjustment and the ability to withstand severe tensional forces.

The present invention accomplishes the foregoing and other objects by a connecting means having two sets of interfitting-tooth connections which are arranged in series or tandem to interconnect the parts to be adjustably joined, with the teeth in one set differently spaced than the teeth of the other set, so that the increments of adjustment of the relative position of the joined parts are not graduated merely by the spacing of the teeth of any one set, but rather in accordance with the difference between the spacing of the teeth of the two sets, which difference may then be made as small as necessary to permit the required accuracy of adjustment without sacrificing the mechanical strength of the teeth. This novel connecting means constitutes, in fact, a differential or vernier connecting device.

The novel features which are considered characteristic of the present invention are set forth in the appended claims. The invention itself, however, both as to its organization and its method of operation, together with additional objects and advantages thereof, will best be understood from the following description of specific embodiments, when read in connection with the accompanying drawing, in which:—

Fig. 1 is a plan view illustrating an application of the present invention to the front rod of a railway track switch.

Fig. 2 is an enlarged sectional view of one form of the present invention which may be used in Fig. 1.

Fig. 3 is an enlarged sectional view of a modified form of the present invention which may also be used in Fig. 1.

Fig. 4 is a sectional view illustrating the manner of mounting a car-carried receiving means used in railway train control systems, also in accordance with the present invention.

In Fig. 1 of the accompanying drawing, a section of track rails 5 carried on usual ties 6 is shown as having switch points 7 and 8 movable relative to the rails 5, to thus constitute a railway track switch. It will be obvious that in such a track switch, these switch points 7 and 8 must be rigidly interconnected to permit a suitable manual or power-operating means, not shown herein, to move the points 7 and 8 in unison toward and away from the associated rails 5, and to securely hold the points in position against vibration and stress imposed thereon by a passing train. It is also necessary to accurately adjust the spacing between the switch points 7 and 8, so that when the switch point operating means is in one position, the point 7 is positioned against one rail, and when the operating means is moved to the other position, the point 8 is moved into position against the other rail.

Consequently, the end portions of the movable points are provided with suitable interconnecting operating rods 9 and 10 respectively attached to the switch points 7 and 8 by brackets 11, the ends of the operating rods 9 and 10 extending outwardly beneath the rails 5, whereby to attach the switch operating means. The inner ends of these rods 9 and 10 are shown in Fig. 1 as overlapping and adjustably connected in accordance with the embodiment of the present invention shown in Fig. 2.

The inner ends of the rods 9 and 10 are preferably enlarged as shown in Fig. 1 and these ends may be slightly offset in opposite directions to overlap as shown in Fig. 2. The lower surface of the enlarged end of rod 9 is provided with transverse teeth 12, and the upper surface of the enlarged end of the rod 10 is also provided with transverse teeth 13, but as may be seen in Fig. 2, the teeth 12 are slightly more widely spaced than teeth 13. An insulating connecting block 14 of fibre, hard rubber, bakelite or other suitable insulating material, is provided between the overlapping enlarged ends of rods 9 and 10, which block 14 is provided with transverse teeth on its upper surface spaced to interfit with the teeth 12 of rod 9, and is also provided with transverse teeth on its lower surface spaced to interfit with teeth 13 of rod 10.

Two bolts 15 pass through holes in the block 14 and through elongated slots in the enlarged ends of both rods 9 and 10, and by tightening nuts 16 threaded on the bolts 15, the rods 9 and 10 may be securely clamped to opposite sides of the block 14, whereby a sturdy connection is made between the rods 9 and 10 through the interfitting arrangement of the teeth 12 and 13 with the block 14. In order to prevent the bolts 15 from electrically connecting the rods 9 and 10, insulating sleeves 17 are provided on the body portions of the bolts 15, and insulating strips 18 separate the nuts 16 and the heads of bolts 15 from the respective rods 9 and 10. In order to prevent damaging the insulating strips 18 by turning the nuts 16 or heads of bolts 15, metal spacing strips 19 may be employed as shown in Fig. 2.

The spacing of the switch points 7 and 8 may now be adjusted by removing or releasing nuts 16, and moving either rod 9 or 10 in the proper direction one or more tooth-spaces on the block 14 as permitted by the elongated slots in the rods 9 and 10. But however, if a change in spacing is required which is shorter than the spacing of the closer teeth 13, the rods 9 and 10 may be moved in opposite direction on the block 14, whereby the resulting change in the spacing of the switch points 7 and 8 will be the difference between the linear spacing of teeth 12 and 13, multiplied by the number of teeth each rod is thus moved. Or, considering merely for illustration that the teeth 12 are linearly spaced ½ inch and the teeth 13 are spaced ⅜ inch, a change of ⅛ inch in the spacing of the switch points 7 and 8 could be produced by moving each of the rods 9 and 10 one tooth-space in opposite directions on the block 14, likewise a change of ¼ inch should be produced by moving the rods 9 and 10 two tooth-spaces in this manner, and of course, a change of ⅜ inch and ½ inch could be obtained by respectively moving rods 9 and 10 alone one tooth-space.

In the form shown in Fig. 2, the block 14 could be made of a suitable metal instead of insulating material in applications wherein it is not necessary to electrically insulate the switch points, and in this case the sleeves 17 and strips 18 could obviously be eliminated.

In the modified arrangement of the adjustable switch-point connecting means shown in Fig. 3, the enlarged ends of the rods 9 and 10 do not overlap, but rather the inner ends are slightly spaced and connected by a link 23. The teeth 12 and 13 are now formed on the lower side of the respective rods 9 and 10, and these teeth match and interfit with teeth 24 and 25 on the upper surface of the associated ends of the link 23.

Four bolts 26 extend through holes in the link 23 and through elongated slots in the enlarged ends of the rods 9 and 10, whereby the rods 9 and 10 are securely clamped on the respective ends of the link 23 by nuts 27 threaded on the bolts 26.

In Fig. 3, the linear spacing between the teeth 12 and 24 is also slightly longer than the spacing between the teeth 13 and 25, and consequently when the nuts 27 are released, the minimum change in the spacing between the switch points 7 and 8, which may be obtained by moving the rods 9 and 10 in opposite directions on the link 23, is the difference between the linear spacing of the teeth 12 and 13, and obviously the same increments of adjustment in the spacing of the switch points 7 and 8 are possible with the form shown in Fig. 3 as previously described in connection with the form shown in Fig. 2.

In Fig. 4 of the accompanying drawing, a method of adjustably mounting a train control receiver upon a railway vehicle is shown, and in order to simplify the drawing, the train control receiver has not been shown in detail, but may be of the type disclosed in Patent No. 1,710,655 granted to C. S. Bushnell on April 23, 1929. The member 30 in Fig. 4 represents one of two upwardly extending arms of the receiver housing, whereby the receiver is mounted on brackets extending horizontally from the journal box of a railway vehicle, which brackets have been represented by member 31.

A metallic block 32 is interposed between the bracket member 31 and the arm member 30, the bracket 31 and one side of the block 32 having interfitting teeth 33, while the other side of the block 32 and the arm 30 have interfitting teeth 34 which are slightly finer or spaced slightly closer than the teeth 33. A bolt 35 passes through a hole in the bracket 31 and through elongated slots in both the block 32 and arm 30, whereby the teeth 33 and 34 are clamped in interfitting relationship by a nut 36 threaded on the bolt 35.

In such train control systems, the receiver must be mounted to pass within rather accurately spaced relation to cooperating trackway devices, and by mounting the receiver in this manner, the nuts 36 may be released and the arm 30 may be moved one tooth-space in one direction upon the block 32 while the block 32 together with the arm 30 may then be moved one tooth-space in the other direction on the bracket 31, thereby raising or lowering the receiver relative to the bracket 31 only the difference between the spacing of teeth 33 and 34. In other words, in the arrangement shown in Fig. 4, various combinations of movements of the arm 30 and the block 32 result in a vertical movement of the receiver upon the railway vehicle in rather small increments determined by the difference in the spacing between teeth 33 and 34.

From the foregoing description of the various embodiments of the present invention, it will be obvious that slipping of the connected parts is prevented by interfitting teeth, or the like, which teeth necessarily graduate the adjustment of one member relative to the other, but by the provision of two sets of such interfitting teeth, which are in tandem and have a slight difference in the spacing of teeth, a much finer overall adjustment has been made possible than is permitted by the spacing of any one set of teeth. The obvious advantages of this arrangement are that the interfitting teeth of each set may then be as deep and widely spaced as is necessary to withstand the forces to which they are subjected, and yet the graduated increments of adjustment may be as minute as desired, inasmuch as the factor determining the size of such increments is the difference between the spacing of the two sets of interfitting teeth.

The above rather specific description of the selected forms of the present invention has been given solely by the way of example, and is not intended, in any manner whatsoever, in a limiting sense. It is also to be understood that various modifications, adaptations and alterations may be applied to meet the requirements of practice, without departing from the spirit or scope of the present invention, except as limited by the appended claims.

Having described my invention, I now claim:—

1. In an adjustable connection for railway switch rails, inwardly extending overlapping rods connected to the rails, a connecting block between the overlapping portions of the rods, a first series of transverse interfitting teeth connecting one rod to one side of the connecting block, a second series of transverse interfitting teeth connecting the other rod to the other side of the connecting block, the first series of teeth being differently spaced than the second series of teeth, and means for clamping the rods in various positions on opposite sides of the connecting block.

2. In an adjustment for railway switch rails, inwardly extending rods connected to the rails, a connecting member having a series of transverse teeth interfitting with teeth on one rod and a differently spaced series of transverse teeth interfitting with teeth on the other rod, and means for clamping the rods in various positions on the connecting member.

3. In an adjustable connection for railway switch points, inwardly extending rods connected to each switch point, a connecting member adjustably clamped to an inner end of each rod, and spaced transverse teeth on each rod interfitting with teeth on the connecting member, the teeth on one rod being differently spaced than the teeth on the other rod, whereby to permit an adjustment in the spacing of the switch points in accordance with said difference in spacing of teeth.

4. In an adjustment for railway switch rails, inwardly extending rods connected to the rails, an electrical insulating member having a series of transverse teeth interfitting with teeth on one rod and also having a differently spaced series of transverse teeth interfitting with teeth on the other rod, and electrical insulating means operable to clamp the rods in various positions on the electrical insulating member.

5. In an adjustable connection for railway switch rails, inwardly extending overlapping rods connected to the rails, a connecting block of insulating material positioned between the overlapping portions of the rods, a first series of transverse interfitting teeth connecting one rod to one side of the connecting block, a second series of transverse interfitting teeth connecting the other rod to the other side of the connecting block, the first series of teeth being differently spaced than the second series of teeth, and means for clamping the rods in various positions on opposite sides of the connecting block.

OSCAR H. DICKE.